No. 623,875. Patented Apr. 25, 1899.
C. C. BRANDON.
FOLDING TRAP.
(Application filed Nov. 29, 1898.)
(No Model.) 2 Sheets—Sheet 1.
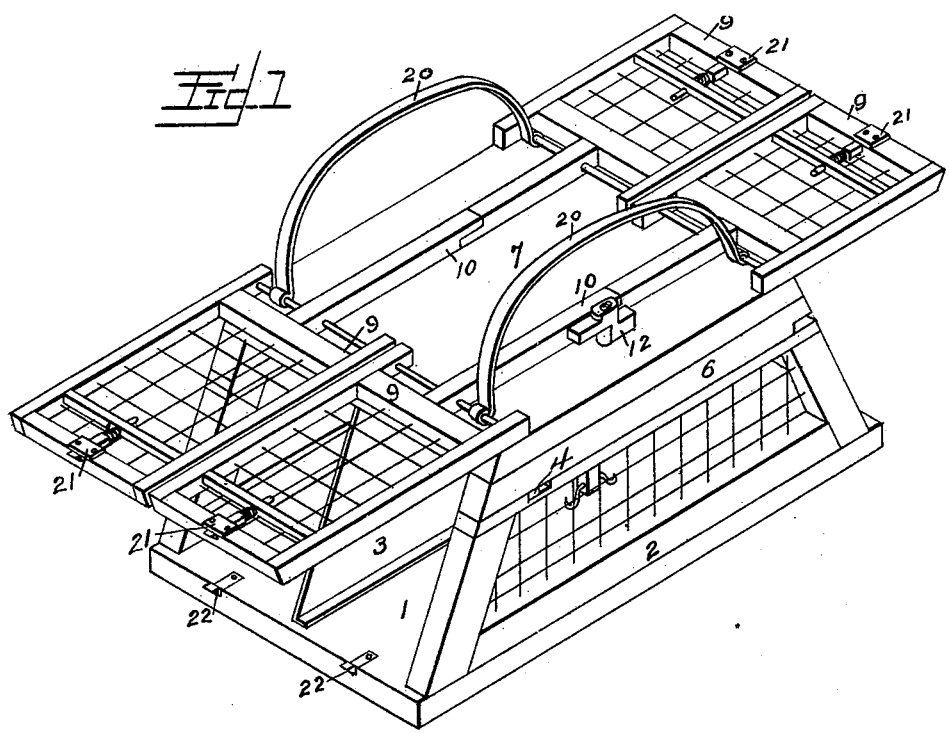
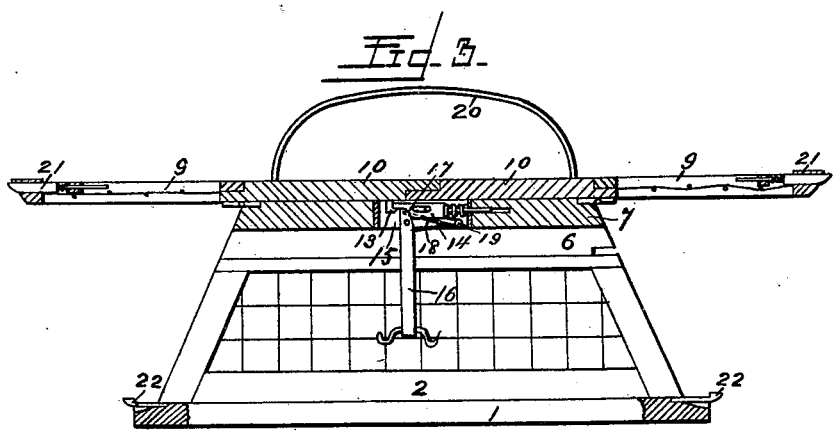
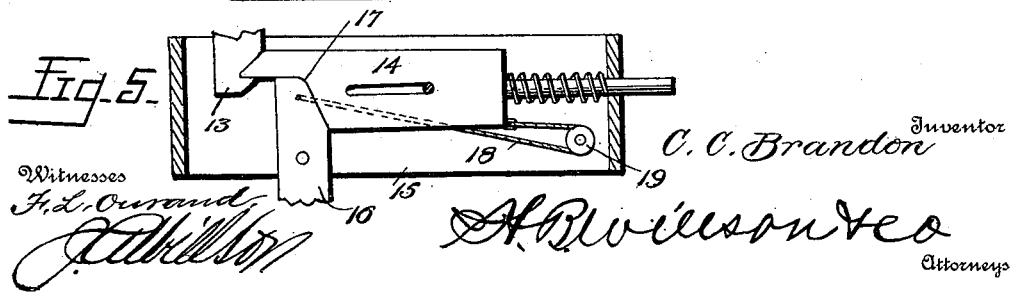
Witnesses
C. C. Brandon, Inventor
Attorneys
THE NORRIS PETERS CO., PHOTO-LITHO., WASHINGTON, D. C.

No. 623,875. Patented Apr. 25, 1899.
C. C. BRANDON.
FOLDING TRAP.
(Application filed Nov. 29, 1898.)
(No Model.)
2 Sheets—Sheet 2.
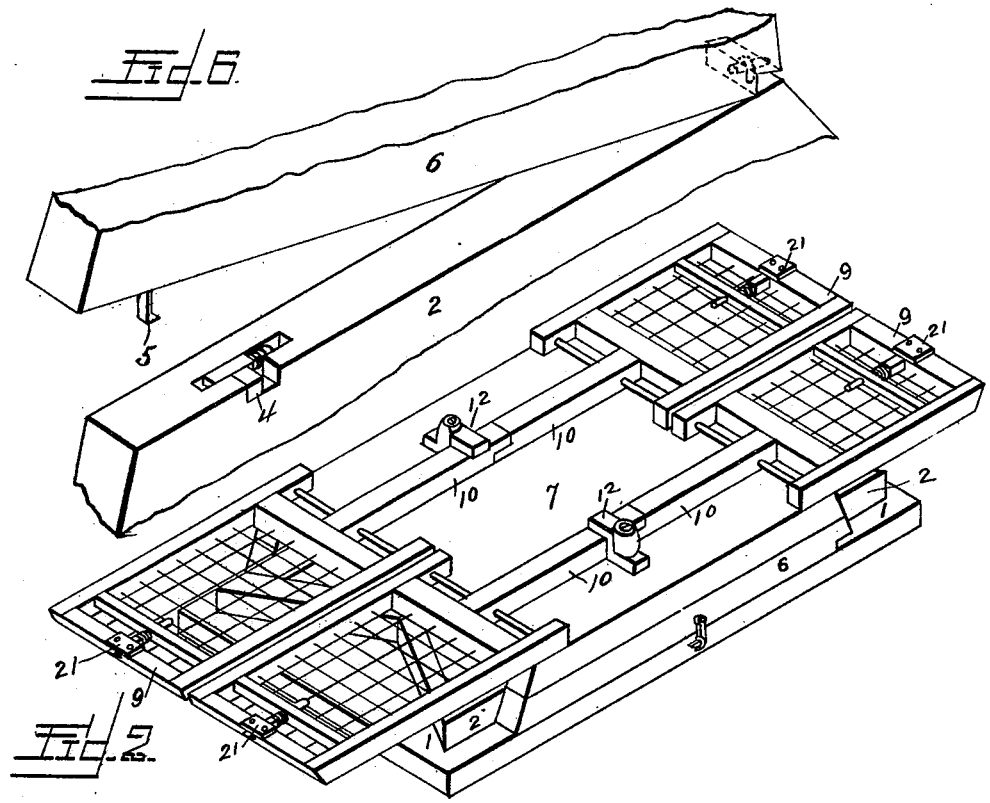
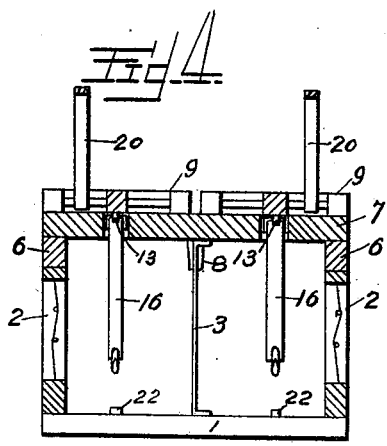
WITNESSES:
INVENTOR
C. C. Brandon.
BY
ATTORNEYS
THE NORRIS PETERS CO., PHOTO-LITHO., WASHINGTON, D. C.

UNITED STATES PATENT OFFICE.

CALLIE CECIL BRANDON, OF SEELIG, ARKANSAS, ASSIGNOR OF ONE-HALF TO A. B. BRANDON AND J. C. CALLAWAY, OF SAME PLACE.

FOLDING TRAP.

SPECIFICATION forming part of Letters Patent No. 623,875, dated April 25, 1899.

Application filed November 29, 1898. Serial No. 697,776. (No model.)

*To all whom it may concern:*

Be it known that I, CALLIE CECIL BRANDON, a citizen of the United States, residing at Seelig, in the county of Lee and State of Arkansas, have invented certain new and useful Improvements in Folding Traps; and I do declare the following to be a full, clear, and exact description of the invention, such as will enable others skilled in the art to which it appertains to make and use the same.

My invention relates to an improved form of folding or collapsible trap for rodents and the like; and the object is to provide a simple, inexpensive, and effective device of this character.

To this end the invention consists in certain features of construction and combination of parts, which will be hereinafter fully described, and particularly pointed out in the appended claims.

In the accompanying drawings the same reference characters indicate the same parts of the invention.

Figure 1 is a perspective view of my improved folding trap as it appears set ready for use. Fig. 2 is a similar view showing the trap folded for transportation. Fig. 3 is a longitudinal section on the line of one of the triggers. Fig. 4 is a transverse section, and Fig. 5 is a detail of the double-acting trigger.

In said drawings, 1 denotes the base or bottom plate, to which the reticulated side walls 2 2 are hinged, as shown, and 3 represents a longitudinal partition also hinged to the base-plate parallel with and midway between the side walls.

4 4 denote sliding bolts let in the upper edges of the outer ends of the side walls, which engage depending staples or keepers 5 5 on the side rails 6 6, fixed to the top 7, and 8 8 denote bifurcated pawls which are hinged to the outer edges of the top to engage the projecting upper edges of the partition to retain it in a vertical position.

9 9 denote the doors, which are independently hinged to the outer ends of the top at each end of the trap-chambers, and the upper end of each door is provided with a fixed arm 10, the free end of which is recessed, as shown, to coact with the reversely-recessed end of the corresponding arm on the opposite door of the same trap-chamber.

12 denotes a button pivoted on the top of the trap and in the path of the meeting ends of the door-arms to retain the doors in the elevated position while the trigger mechanism is being adjusted.

The overlapping arm of one of the doors is provided with a lateral notched toe 13, which projects into the path of a sliding bolt 14, mounted in a boxing 15, removably secured in a suitable orifice formed in the top, and in this boxing is pivoted the depending trigger 16, to the lower end of which the bait or lure is fixed. The upper end of the trigger projects into the path of the shoulder 17, formed on the lower face of the bolt 14, so that when the trigger is moved toward the shoulder on the bolt the latter will be withdrawn from the path of the notched toe 13 on the door-arm, and consequently release it and allow the doors to close. A cord 18 extends from the upper end of the trigger over a guide-roller 19 to a staple on the bolt, so that when the trigger is moved away from the shoulder 17 the bolt will be moved in the same direction as first indicated and release the doors, as heretofore described. It will thus be seen that the trap-doors will be released upon the trigger 16 being moved in either direction, for by referring to Fig. 3, which shows the trap set, if the lower end of said trigger be moved to the left its upper end will be moved to the right and coming in contact with the shoulder 17 on the bolt 14 will withdraw the bolt from the notched toe 13 and release the doors. On the other hand if the lower end of the trigger be moved to the right its upper end will be moved to the left, and consequently away from the shoulder 17 on the bolt 14, and at the same time the cord 18, which is fastened to the upper end of the trigger and after passing around the guide-roller 19 is fixed to the bolt, draws the bolt backward and away from the notched toe 13, and thereby releases the doors, as in the first instance.

20 denotes a semielliptical spring, the free ends of which are pivoted to the upper ends of the coacting doors to insure their closing when released.

21 denotes a spring-actuated bolt fixed in the outer end of each door to engage a keeper 22, and thereby lock the door when closed.

It will be understood that various changes in the form, proportion, and the minor details of construction may be resorted to without departing from the spirit or sacrificing any of the advantages of this invention.

Having thus fully described my invention, what I claim, and desire to secure by Letters Patent, is—

1. In a trap of the class described, a pair of coacting spring-actuated doors provided with fixed arms having their meeting ends recessed to overlap, a notched toe carried by the overlapping arm, a bolt mounted in the path of said toe, and a pivoted trigger arranged to withdraw said bolt from said notched toe by a movement imparted to it in either direction, substantially as set forth for the purpose described.

2. In a trap of the class described, a pair of hinged doors provided with rigid arms having their meeting ends recessed to overlap, a notched toe carried by the overlapping arm, the sliding bolt 14 mounted in the path of the notched toe and formed with the shoulder 17, the pivoted trigger 16 having its upper end projecting into the path of the shoulder on said bolt, the stationary guide-roller 19 and the flexible cord 18 passing around said roller and having its free ends fastened to said trigger and bolt, substantially as and for the purpose described.

In testimony whereof I have hereunto set my hand in presence of two subscribing witnesses.

CALLIE CECIL BRANDON.

Witnesses:
 ANDREW BRANDON,
 JAMES CALLAWAY.